US007776475B2

(12) United States Patent
Shimizu et al.

(10) Patent No.: US 7,776,475 B2
(45) Date of Patent: Aug. 17, 2010

(54) LITHIUM RECHARGEABLE BATTERY AND LITHIUM RECHARGEABLE BATTERY PACK

(75) Inventors: Ryuichi Shimizu, Yokohama (JP);
Takitaro Yamaguchi, Yokohama (JP);
Cheol-Soo Jung, Suwon-si (KR);
Hyun-Jei Chung, Suwon-si (KR);
Young-Chul Chang, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 478 days.

(21) Appl. No.: 11/194,562

(22) Filed: Aug. 2, 2005

(65) Prior Publication Data
US 2006/0035144 A1    Feb. 16, 2006

(30) Foreign Application Priority Data
Aug. 3, 2004    (JP)    ............. 2004-226620
Mar. 29, 2005   (KR)   ............. 10-2005-0025912

(51) Int. Cl.
*H01M 4/58*   (2010.01)
(52) U.S. Cl. .............. 429/231.95; 429/188; 429/339; 429/307; 429/245
(58) Field of Classification Search ............... 429/231, 429/231.95, 188, 339, 307, 245
See application file for complete search history.

(56) References Cited

U.S. PATENT DOCUMENTS

| 5,589,295 A | * | 12/1996 | Derzon et al. ............ 429/303 |
| 6,045,952 A | * | 4/2000 | Kerr et al. ............... 429/307 |
| 6,277,525 B1 | * | 8/2001 | Yamamoto et al. ......... 429/326 |
| 2003/0162096 A1 | * | 8/2003 | Michot et al. ............ 429/307 |
| 2008/0057402 A1 | * | 3/2008 | Abe et al. ............... 429/333 |

FOREIGN PATENT DOCUMENTS

| JP | 09-063652 | 3/1997 |
| KR | 1020040010189 | 1/2004 |
| KR | 1020040020880 | 3/2004 |

* cited by examiner

*Primary Examiner*—Jane Rhee
(74) *Attorney, Agent, or Firm*—H.C. Park & Associates, PLC

(57) ABSTRACT

A lithium rechargeable battery includes a positive electrode that intercalates and deintercalates lithium and a negative electrode that intercalates and deintercalates lithium and has a current collector including Cu or a Cu alloy. In addition, the battery includes a separator interposed between the positive electrode and the negative electrode, and an electrolyte that transfers lithium ions.

9 Claims, 1 Drawing Sheet

LITHIUM RECHARGEABLE BATTERY AND LITHIUM RECHARGEABLE BATTERY PACK

CROSS-REFERENCE TO RELATED APPLICATION

This application claims priority to and the benefit of Japanese Application No. 2004-226620 filed with the Japanese Patent Office on Aug. 3, 2004 and Korean Patent Application No. 10-2005-0025912 filed with the Korean Intellectual Property Office on Mar. 29, 2005, which are hereby incorporated by reference for all purposes as if fully set forth herein.

BACKGROUND OF THE INVENTION

1. Field of the Invention

The present invention relates to a lithium rechargeable battery and a lithium rechargeable battery pack that has improved over-discharge characteristics.

2. Discussion of the Background

Rechargeable batteries with a high power storage capacity are being developed to power small, high power electronic devices such as video cameras and portable stereos. Lithium rechargeable batteries may use carbonaceous materials as a negative active material and a lithium cobalt oxide ($LiCoO_2$) as a positive active material. The lithium rechargeable batteries typically exhibit high energy density, high power storage capacity, and good cycle life characteristics.

Many lithium rechargeable batteries undergo deterioration of charge characteristics at over-discharge. When an electronic device malfunctions or uses a battery that has a cut-off voltage that is not set for the electronic device, open circuit voltage (OCV) is not restored even though a circuit is open when a discharge voltage is 0 V. Then when the battery is charged and discharged, the battery capacity may deteriorate significantly and may result in an internal short-circuit. In this way, charge and discharge characteristics in case of over-discharge to 0 V are very important in the commercialization of a rechargeable battery. Therefore, the deterioration of charge and discharge characteristics may be alleviated.

Performance deterioration and shortening of cycle-life upon over-discharge result from dissolution of copper from the negative current collector. Dissolution is induced when the potential of copper increases to 3.5 V (vs. Li) or when the operation potential of a positive electrode at a final step of over-discharge exceeds the deposition dissolution potential of 3.45 V (vs. Li).

Lithium rechargeable batteries are often equipped with an over-charge protection circuit that can stop discharge of lithium rechargeable batteries when an electronic device malfunctions and prevent loss of battery capacity due to over-discharge. Generally, such a protection circuit may protect from both over-charge and over-discharge (e.g., Japanese Patent Laid-Open No. Hei 9-63652). However, these conventional lithium rechargeable batteries require a means to install the over-discharge protection circuit. In addition, an over-discharge protection circuit must be individually designed for each electronic device.

SUMMARY OF THE INVENTION

The present invention provides a lithium rechargeable battery that prevents dissolution of the negative current collector at over-discharge and does not require an over-discharge protection circuit. This allows the lithium rechargeable battery to be fabricated at a low-cost.

The present invention also provides a lithium rechargeable battery pack that includes the lithium rechargeable battery.

Additional features of the invention will be set forth in the description which follows, and in part will be apparent from the description, or may be learned by practice of the invention.

The present invention discloses a lithium rechargeable battery comprising a positive electrode that intercalates and deintercalates lithium, a negative electrode that intercalates and deintercalates lithium, a separator that is interposed between the positive electrode and the negative electrode, and an electrolyte that transfers lithium ions. The negative electrode includes a current collector that includes Cu or a Cu alloy. The electrolyte includes multi-functional compounds that have at least two functional groups and has a high affinity for Cu or a Cu alloy.

The present invention also discloses a lithium rechargeable battery pack comprising a lithium rechargeable battery comprising a positive electrode comprising a positive active material that intercalates and deintercalates lithium, a negative electrode comprising a current collector comprising Cu or a Cu alloy and a negative active material that intercalates and deintercalates lithium, and an electrolyte that transfers lithium ions and comprises multi-functional compounds that have at least two functional groups and high affinity for Cu or a Cu alloy.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
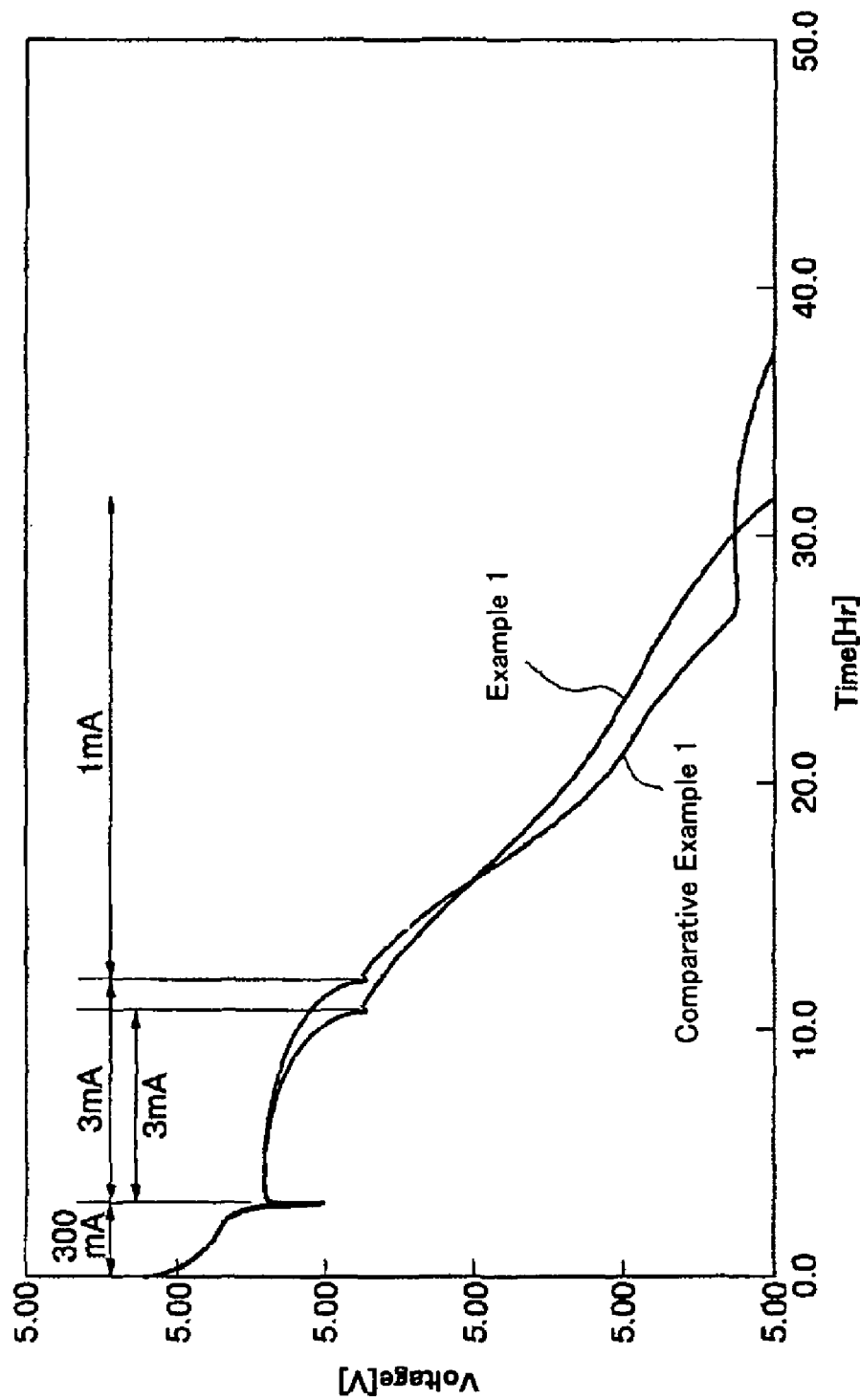
FIG. 1 graphically depicts a discharge voltage curve as a function of discharge time of lithium rechargeable battery cells of Example 1 of the present invention and Comparative Example 1.

The lithium rechargeable battery of the present invention prevents dissolution of the negative current collector at over-discharge and does not require an over-discharge protection circuit, resulting in reduction of cost.

The lithium rechargeable battery of the present invention comprises a positive electrode that intercalates and deintercalates lithium, a negative electrode that intercalates and deintercalates lithium, a separator interposed between the positive electrode and a negative electrode, and an electrolyte that transfers lithium ions. The negative electrode includes a current collector comprising Cu or a Cu alloy. The electrolyte includes multi-functional compounds that have at least two functional groups and a high affinity for Cu or a Cu alloy.

The positive electrode may be fabricated by mixing a positive active material, a binder such as polyvinylidene fluoride, and a conductive agent such as carbon black to obtain a slurry. The slurry is coated on a current collector and formed into a sheet, for example, such that the positive active material adheres to the current collector. The current collector of the positive electrode includes a foil or a mesh comprising a metal such as aluminum or stainless steel, for example.

The positive active material may include a composite oxide of lithium and at least one selected from cobalt, manganese, and nickel. Specific examples of the positive active material may include $LiMn_2O_4$, $LiCoO_2$, $LiNiO_2$, $LiFeO_2$, $V_2O_5$, but are not limited thereto. It may further include a compound such as TiS, MoS, an organic disulfide compound, or an organic polysulfide compound, that is capable of reversible intercalation and deintercalation of lithium ions.

The negative electrode may be fabricated by mixing a negative active material, a binder such as polyvinylidene fluoride, and a conductive agent such as carbon black to obtain a slurry. The slurry is coated on a current collector and formed into a sheet, for example, such that the negative active material adheres to the current collector. The current collector of the negative electrode includes a metal foil or a metal net including Cu or a Cu alloy.

The negative active material may include a carbonaceous material such as artificial graphite, natural graphite, graphitized carbon fibers, graphitized mesocarbon microbead, amorphous carbons, and so on. A metal that may alloy with lithium such as Al, Si, Sn, Pb, Zn, Bi, In, Mg, Ga, Cd, and so on or a composite of metal and carbonaceous material may also be used as a negative active material. A lithium metal foil may also be used as a negative active material.

Any workable separator such as a porous polypropylene film or a porous polyethylene film may be used.

The electrolyte may be a liquid-phase electrolyte or a solid-phase polymer electrolyte. In the present invention, any type of electrolyte may be used, and it may also include a non-aqueous solvent, a lithium salt, and an additive, regardless of the type of the electrolyte. The electrolyte may preferably be a nonflammable electrolyte that further includes a flame retardant.

The additive compound may be a multi-functional compound that includes at least two functional groups and has a high affinity for Cu or Cu alloy of the current collector of the negative electrode. The functional groups of the multi-functional compound may be aprotic electron releasing groups including, but not limited to a nitrile group, a nitro group, a methoxy group, an ethoxy group, a dimethylamino group, an ethylamine group, a phenyl group, a pyridinyl group, or a thioether group.

The multi-functional compounds that are added to the electrolyte accumulate in a high concentration on the surface of the current collector of the negative electrode, thereby improving the dissolution potential of Cu or Cu alloy of the current collector. Therefore, even if the lithium rechargeable battery over-discharges, the current collector of the negative electrode will not dissolve and a decrease in the power storage capacity may be prevented.

The multi-functional compound may include, but is not limited to malononitrile, succinonitrile, glutaronitrile, adiponitrile, pimelonitrile, suberonitrile, azelanitrile, sebaconitrile, undecanenitrile, dodecanedinitrile, 3-hexenedinitrile, phthalonitrile, isophthalonitrile, tetraphthalonitrile, methylglutaronitrile, dimethylmalononitrile, dimethylmalononitrile, tertbutylmalononitrile, oxydipropinonitrile, ethyleneglycolbispropinonitrileether, cyclohexanetricarbonitrile, thiodipropinonitrile, triscyanoethylamine or triscyanoethoxypropane.

Preferred multi-functional compounds include succinonitrile ($NC(CH_2)_2CN$), glutaronitrile ($NC(CH_2)_3CN$), adiponitrile ($NC(CH_2)_4CN$), thiodipropinonitrile, or cyclohexanetricarbonitrile, for example.

The distance between the functional groups in the multi-functional molecule is a critical factor. If the distance is great, the affinity for Cu or Cu alloy decreases and the compound is less effective. On the other hand, if the distance is too small, the affinity for lithium ions becomes greater than the affinity for Cu or a Cu alloy, resulting in deterioration of battery capacity.

The multi-functional compound may have a concentration ranging from about 0.1 wt % to about 50 wt % and preferably from about 0.5 wt % to about 15 wt % based on the total weight of the electrolyte. When the concentration is less than 0.1 wt %, dissolution potential does not improve sufficiently. When the concentration is greater than 50 wt %, the lithium ion conductivity of the electrolyte may decrease.

The solvent included in the electrolyte may include cyclic carbonates and linear carbonates, for example.

The cyclic carbonate may include, but is not limited to at least one of ethylene carbonate, butylene carbonate, propylene carbonate, and γ-butyrolactone. The cyclic carbonates easily dissolve with lithium ions, thereby increasing the ion conductivity of the electrolyte.

The linear carbonate may include, but is not limited to at least one of dimethylcarbonate, methylethylcarbonate, and diethylcarbonate. Since such a linear carbonate has low viscosity, it can decrease the viscosity of the electrolyte, thereby increasing ion conductivity. However, since the linear carbonate has a low flash point, it may lower the flash point of the electrolyte if it has an excessively high concentration which is not preferable.

The lithium salt may include but is not limited to $LiPF_6$, $LiBF_4$, $Li[N(SO_2C_2F_6)_2]$, $Li[B(OCOCF_3)_4]$ or $Li[B(OCOC_2F_5)_4]$. The lithium salt may have a concentration of about 0.5 mol/L to about 2.0 mol/L of the electrolyte. The lithium salt included in the electrolyte may increase ion conductivity of the electrolyte.

The following examples illustrate the present invention in more detail. However, it is understood that the present invention is not limited by these examples.

EXAMPLE 1

$LiCoO_2$ with an average particle diameter of 10 μm as a positive active material, polyvinylidene fluoride as a binder, and carbon powders having an average particle diameter of 3 μm as a conducting agent were mixed. This mixture was then combined with N-methyl-2-pyrrolidone to prepare a positive electrode slurry. The positive electrode slurry was coated onto a 20 μm thick aluminum foil as a positive current collector and then dried at 120° C. for 24 hours under vacuum, thereby volatilizing N-methyl-2-pyrrolidone. The resulting coated positive current collector was then compressed to form a positive electrode.

A mixture including 95 parts by weight of artificial graphite with an average particle diameter of 15 μm and 5 parts by weight of polyvinylidene fluoride as a binder was made. The mixture was then combined with N-methyl-2-pyrrolidone to prepare a negative electrode slurry. The negative electrode the was coated onto a 14 μm thick Cu foil as a negative current collector and then dried at 120° C. for 24 hours under vacuum atmosphere, thereby volatilizing N-methyl-2-pyrrolidone. The resulting coated negative current collector was then compressed to form a negative electrode.

$LiPF_6$ was added to a solvent, which included ethylene carbonate (EC) and diethylcarbonate (DEC) mixed in a volume ratio of EC:DEC=30:70, at a concentration of 1.3 mol/L. To prepare an electrolyte, 3 wt% of succinonitrile was added to the solvent.

A polypropylene porous separator was interposed between the positive electrode and negative electrode and then spirally wound to form an electrode assembly. The electrode assembly was placed into a laminated battery case and the electrolyte was injected into the case. The case was closed and sealed to fabricate a lithium rechargeable battery cell.

COMPARATIVE EXAMPLE 1

A lithium rechargeable battery cell was fabricated following the same method as in Example 1, except that succinonitrile was not added to the electrolyte.

The battery cells of Example 1 and Comparative Example 1 had a nominal discharge capacity of 820 mAh.

Over-discharge tests were performed on the lithium rechargeable battery cells of Example 1 and Comparative Example 1. Whether or not the current collector of the negative electrode dissolved was also evaluated. The over-discharge test was performed by first pre-charging the cells to a voltage of 4.2 V. The cells were discharged at a current of 300 mAh to a voltage of 3 V, discharged at 3 mA to a voltage of 2.7 V, and finally discharged at 1 mA to 0 V.

The results are shown in FIG. 1.

As seen in FIG. 1, the discharge curve of Example 1 shows a linear reduction at 1 mA. It is expected that there is no dissolving of the negative current collector (Cu) during discharge in Example 1. On the other hand, the discharge curve of Comparative Example 1 shows a plateau region at final discharge at 1 mA. This plateau corresponds to dissolution of the current collector (Cu) of the negative electrode of Comparative Example 1 at over-discharge.

From the above results, it can be seen that succinonitrile (dinitrile compound) added in an electrolyte prevents dissolution of a negative current collector at over-discharge.

EXAMPLE 2

A positive active material, a binder, and a conductive agent were coated on an Al foil as a positive current collector to fabricate a positive electrode in the same manner as in Example 1. A negative active material and a binder were coated on a Cu foil as a negative current collector to fabricate a negative electrode in the same manner as in Example 1.

$LiPF_6$ was added to a solvent, which included EC, γ-butyrolactone (GBL), and DEC mixed in a volume ratio of EC:GBL:DEC=30:50:50, at a concentration of 1.3 mol/L. In addition, 3 wt % of flurorethylene carbonate (FEC) and 1 wt % to 10 wt % of succinonitrile were added. Subsequently, diacryl monomer as a material for forming a polymer electrolyte and a 2,2'-axo-bis(isobutyronitrile) polymerization initiator were added to prepare an electrolyte.

A polypropylene porous separator was interposed between the positive electrode and the negative electrode and spirally wound together to form an electrode assembly. The electrode assembly was placed into a laminated battery case, and the electrolyte was injected into the case. The case was closed by sealing and heated at 80° C. for 4 hours to form a lithium polymer rechargeable battery cell. The lithium polymer rechargeable battery cell of the present invention was designed to not require an overcharge protection circuit.

EXAMPLES 3 TO 5

Lithium polymer rechargeable battery cells were fabricated with the same method as in Example 2, except that the concentration of succinonitrile was changed as shown in the following Table 1.

COMPARATIVE EXAMPLE 2

A lithium polymer rechargeable battery cell was fabricated following the same method as in Example 2, except that succinonitrile was not added.

The lithium rechargeable battery cells of Examples 2 to 5 and Comparative Example 2 were discharged at 164 mA to measure the second cycle discharge capacity.

Over-discharge cycle tests were performed to measure over-discharge characteristics. The over-discharge cycle experiments were performed by charging the battery cells to a voltage of 4.2 V. The cells were discharged at a current of 300 mAh to a voltage of 3 V, discharged at 3 mA to a voltage of 2.7 V, and finally discharged at 1 mA to 0 V. Such a charge and discharges were repeated three times.

The results are shown in the following Table 1.

TABLE 1

| | Succinonitrile (wt %) | Capacity at Third Cycle During Over-discharge (mAh) | Initial Capacity (mAh) |
|---|---|---|---|
| Example 2 | 1 | short-circuit | 844 |
| Example 3 | 3 | 824 | 843 |
| Example 4 | 5 | 823 | 841 |
| Example 5 | 15 | 826 | 840 |
| Comparative Example 2 | 0 | short-circuit | 846 |

As shown in Table 1, the lithium polymer rechargeable battery cells showed an improved over-discharge inhibition characteristics when succinonitrile was added in a concentration of 3 wt % or more. The results show that battery cells without protection circuits are practicable.

EXAMPLE 6

A positive active material, a binder, and a conductive agent were coated on an Al foil as a positive current collector to fabricate a positive electrode in the same manner as in Example 1. A negative active material and a binder were coated on a Cu foil as a negative current collector to fabricate a negative electrode in the same manner as in Example 1.

$LiPF_6$ was added to a solvent, which included EC and DEC mixed in a volume ratio of EC:DEC=30:70, at a concentration of 1.3 mol/L. In addition, 0.5 wt % of succinonitrile was added to prepare an electrolyte.

A polypropylene porous separator was interposed between the positive electrode and the negative electrode and spirally wound together to form an electrode assembly. The electrode assembly was placed into a laminated battery case, and the electrolyte was injected into the case. The case was closed by sealing to form a laminated lithium rechargeable battery cell.

EXAMPLES 7 TO 12

Laminated lithium rechargeable battery cells were fabricated in the same manner as in Example 6, except that the types and concentrations of dinitrile compounds used were changed as shown in the following Table 2.

The lithium rechargeable battery cells of Examples 6 to 12 were charged and discharged in the same manner as in Example 2 to evaluate over-discharge cycle characteristics. The results are shown in the following Table 2. For comparison, the results of battery cell of Comparative Example 1 are shown in Table 2.

TABLE 2

|  | Type of Dinitrile Compound | Concentration of dinitrile compounds used (wt %) | Capacity at Third Cycle During Over-discharge (mAh) |
|---|---|---|---|
| Example 6 | succinonitrile | 0.5 | 847 |
| Example 7 | succinonitrile | 1.0 | 845 |
| Example 8 | succinonitrile | 3.0 | 827 |
| Example 9 | glutaronitrile | 0.5 | 830 |
| Example 10 | glutaronitrile | 1.0 | 833 |
| Example 11 | glutaronitrile | 3.0 | 833 |
| Example 12 | adiponitrile | 3.0 | 811 |
| Comparative Example 1 | — | 0 | 741 |

As shown in Table 2, the lithium polymer rechargeable battery cells including a non-aqueous electrolyte of the present invention show good results even when the dinitrile compound was added in a concentration of 0.5 wt %. Furthermore, improved over-discharge inhibition cycle characteristics were obtained by any one of succinonitrile, glutaronitrile, and adiponitrile. The lithium polymer rechargeable battery cells showed improved performances at lower concentrations than Example 2. This result may have occurred because the dinitrile compounds may accumulate on the surface of the negative current collector at a higher concentration in a liquid electrolyte than in a polymer electrolyte.

EXAMPLES 13 TO 16

Lithium polymer rechargeable battery cells were fabricated following the same method as in Example 6, except that the types of multi-functional compounds and concentrations thereof were changed as shown in the following Table 3. In Examples 15 and 16 where two mixed multi-functional compounds were used, the two compounds were used in a mixed weight ratio of 1:1.

Lithium rechargeable battery cells of Examples 13 to 18 were charged and discharged in the same manner as in Example 2 to evaluate over-discharge cycle characteristics. The results are shown in the following Table 3. For comparison, the results of battery cell of Comparative Example 1 are shown in the Table 3.

TABLE 3

|  | Types of multi-functional compounds | Concentration of multi-functional compounds (wt %) | Capacity at Third Cycle During Over-discharge (mAh) |
|---|---|---|---|
| Example 13 | thiodipropinonitrile | 0.5 | 831 |
| Example 14 | thiodipropinonitrile | 1.0 | 823 |
| Example 15 | succinonitrile/ cyclohexane tricarbonitrile | 1.0 | 840 |
| Example 16 | thiodipropinonitrile/ glutaronitrile | 1.0 | 835 |
| Comparative Example 1 | — | 0 | 741 |

As shown in Table 3, the lithium polymer rechargeable battery cells including a non-aqueous electrolyte of the present invention show improved over-discharge cycle characteristics when the multi-functional compounds were added.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A lithium rechargeable battery, comprising:
    a positive electrode comprising a positive active material that intercalates and deintercalates lithium;
    a negative electrode comprising a current collector comprising Cu or a Cu alloy and a negative active material that intercalates and deintercalates lithium; and
    an electrolyte that transfers lithium ions, the electrolyte comprising a solvent and a multi-functional compound that has at least two functional groups and high affinity for Cu or a Cu alloy, the solvent comprising at least one of cyclic carbonates and linear carbonates,
    wherein the multi-functional compound is at least one selected from the group consisting of pimelonitrile, suberonitrile, azelanitrile, sebaconitrile, dodecanedinitrile, phthalonitrile, isophthalonitrile, tetraphthalonitrile, oxydipropinonitrile, ethyleneglycolbispropinonitrileether, thiodipropinonitrile, triscyanoethylamine and triscyanoethoxypropane.

2. The lithium rechargeable battery of claim 1, wherein the functional groups are aprotic electron releasing groups.

3. The lithium rechargeable battery of claim 1, wherein the multi-functional compound is thiodipropinonitrile.

4. The lithium rechargeable battery of claim 1, wherein a concentration of the multi-functional compound is about 0.1 wt % to about 50 wt % based on the total weight of the electrolyte.

5. The lithium rechargeable battery of claim 4, wherein a concentration of the multi-functional compound is about 0.5 wt % to about 15 wt % based on the total weight of the electrolyte.

6. The lithium rechargeable battery of claim 1, wherein the electrolyte is a polymer electrolyte or a liquid electrolyte.

7. A lithium rechargeable battery pack, comprising:
    a lithium rechargeable battery comprising
    a positive electrode comprising a positive active material that intercalates and deintercalates lithium;
    a negative electrode comprising a current collector comprising Cu or a Cu alloy and a negative active material that intercalates and deintercalates lithium; and
    an electrolyte that transfers lithium ions, the electrolyte comprising a solvent and a multi-functional compound that has at least two functional groups and high affinity for Cu or a Cu alloy, the solvent comprising at least one of cyclic carbonates and linear carbonates,
    wherein the multi-functional compound is at least one selected from the group consisting of pimelonitrile, suberonitrile, azelanitrile, sebaconitrile, dodecanedinitrile, phthalonitrile, isophthalonitrile, tetraphthalonitrile, oxydipropinonitrile, ethyleneglycolbispropinonitrileether, thiodipropinonitrile, triscyanoethylamine and triscyanoethoxypropane.

8. A lithium rechargeable polymer battery, comprising:
a positive electrode comprising a positive active material that intercalates and deintercalates lithium;
a negative electrode comprising a current collector comprising Cu or a Cu alloy and a negative active material that intercalates and deintercalates lithium; and
a solid-phase polymer electrolyte that transfers lithium ions, the electrolyte comprising a solvent and a multi-functional compound that has at least two functional groups and high affinity for Cu or a Cu alloy, the solvent comprising at least one of cyclic carbonates and linear carbonates,
wherein the concentration of the multi-functional compound is about 15 to 50 wt %, and
wherein the multi-functional compound is thiodipropinonitrile.

9. A lithium rechargeable battery, comprising:
a positive electrode comprising a positive active material that intercalates and deintercalates lithium;
a negative electrode comprising a current collector comprising Cu or a Cu alloy and a negative active material that intercalates and deintercalates lithium; and
an electrolyte that transfers lithium ions, the electrolyte comprising a solvent and a multi-functional compound that has at least two functional groups and high affinity for Cu or a Cu alloy, the solvent comprising at least one of cyclic carbonates and linear carbonates, wherein the multi-functional compound is succinonitrile and cyclohexanetricarbonitrile.

* * * * *